United States Patent [19]

Rutschmann

[11] Patent Number: 5,406,913
[45] Date of Patent: Apr. 18, 1995

[54] AIR INTAKE SYSTEM OF AN INTERNAL-COMBUSTION ENGINE

[75] Inventor: Erwin Rutschmann, Tiefenbronn, Germany

[73] Assignee: Dr. Ing. h.c.F. Porsche AG, Weissach, Germany

[21] Appl. No.: 239,304

[22] Filed: May 6, 1994

[30] Foreign Application Priority Data

May 7, 1993 [DE] Germany ............... 43 15 129.9

[51] Int. Cl.⁶ ............................................. F02B 27/02
[52] U.S. Cl. ............................................. 123/184.36
[58] Field of Search ............... 123/184.31, 184.34, 123/184.35, 184.36, 184.44, 184.49

[56] References Cited

U.S. PATENT DOCUMENTS

| | | | |
|---|---|---|---|
| 3,520,284 | 7/1970 | Ruoff et al. | 123/184.34 |
| 4,649,871 | 3/1987 | Hatamura et al. | 123/184.35 |
| 4,803,961 | 2/1989 | Hiraoka et al. | 123/184.36 |
| 4,957,071 | 9/1990 | Matsuo et al. | 123/184.36 |
| 5,000,129 | 3/1991 | Fukada et al. | 123/184.36 |
| 5,027,769 | 7/1991 | Yoshida et al. | 123/184.36 |

FOREIGN PATENT DOCUMENTS

| | | |
|---|---|---|
| 0115153 | 8/1984 | European Pat. Off. . |
| 0158008A2 | 10/1985 | European Pat. Off. . |
| 0167794A1 | 1/1986 | European Pat. Off. . |
| 3424433 | 1/1986 | Germany . |
| 3820674A1 | 12/1989 | Germany . |

OTHER PUBLICATIONS

H. P. Lenz 'Gemischbildung bei Ottomotoren' Dec. 1990, Springer, Wien at Kapitel 5 Absatz 5.2.5 "Variable Sauganlagen" Seite 353–358.
Patent Abstracts of Japan vol. 8, No. 216 (M–329) (1653) 12,84 & JP-A-59 101 535 (Yamaha Hatsudoki K.K.) 12. Jun. 1984.
Research Disclosure, Nr. 267, Jul. 1986, Emsworth, Hampshire GB Seiten 428–430, Engine Intake Tuning.

*Primary Examiner*—Andrew M. Dolinar
*Assistant Examiner*—M. Macy
*Attorney, Agent, or Firm*—Evenson McKeown Edwards & Lenahan

[57] ABSTRACT

The air intake system of a two-bank internal-combustion engine has one resonance receptacle for each cylinder bank and an additional receptacle in the respective center. Via suction pipes, the resonance receptacles are connected to the cylinders and are mutually provided with connecting pipes, fresh air entering into one of these connecting pipes. Suction pipe extensions are connected to the other receptacle which partially extend inside the resonance receptacles and are arranged in them at a distance in an alignment with the admission funnels of the suction pipes. The combination of the connecting pipes acting as resonance pipes and the suction pipe extensions acting as swing pipes causes an increase of the mean pressure which raises the torque as well as the performance of the internal-combustion engine.

13 Claims, 3 Drawing Sheets

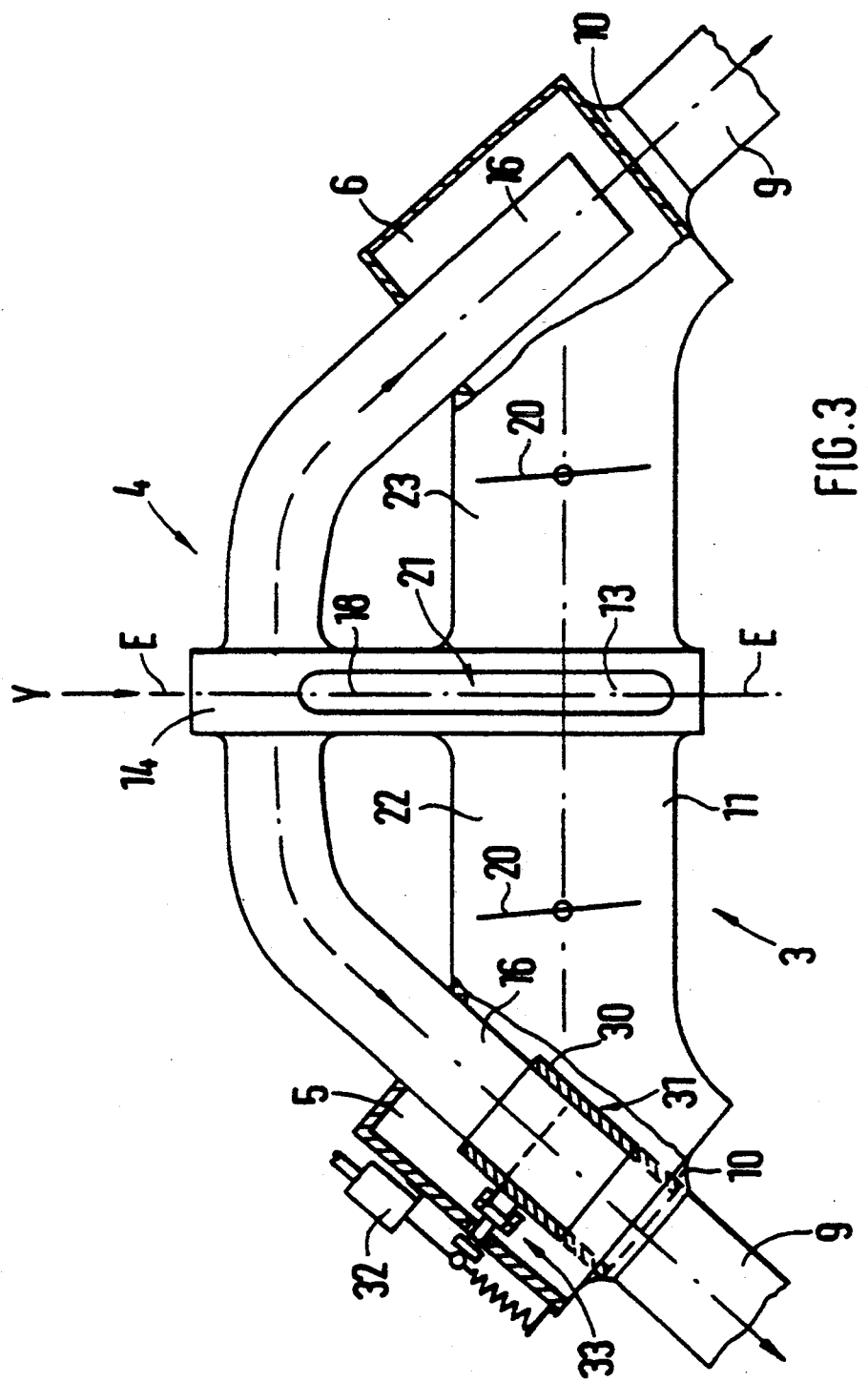

AIR INTAKE SYSTEM OF AN INTERNAL-COMBUSTION ENGINE

BACKGROUND AND SUMMARY OF THE INVENTION

The present invention relates to an air intake system of a multi-cylindrical two-bank internal-combustion engine, the cylinder of one bank each being connected by suction pipes to a resonance assigned to said bank, and comprising at least one connecting pipe between the resonance receptacles.

The performance of an internal-combustion engine is directly proportional to the product of its displacement and the mean pressure. When an increase of the displacement, which is unfavorable with respect to the amount of exhaust gas and to fuel consumption, is to be avoided, only a targeted increase of the mean pressure remains as a means to increase the performance. As a result, the torque of the internal-combustion engine is also increased because it is a direct result of the above-mentioned product.

From German Patent Document DE-34 24 433 A1, an air intake system of the initially-described type is known which has two resonance receptacles. These resonance receptacles are connected with one another by two resonance pipes which can be shut off and into which the supplied fresh air flows. From the resonance receptacles, individual suction pipes lead to the intake ports of the cylinder heads. As a function of the connection cross-section of the receptacles controlled by throttle valves, the mean pressure and therefore the torque can be increased in a wide rotational speed range.

An object of the present invention is to improve an air intake system of the intially-described type in such a manner that the mean pressure is increased, if possible, in the whole rotational speed range of the internal-combustion engine.

This and other objects are achieved by the present invention which provides an air intake system of a multi-cylinder two-bank internal-combustion engine, the cylinder of one bank each being connected by suction pipes to a resonance receptacle assigned to said bank, comprising: at least one connecting pipe between the resonance, and suction pipe extensions that are respectively assigned to the suction pipes. These suction pipe extensions extend inside the resonance receptacles and are connected to a common receptacle that has a fresh-air inlet.

When, in the case of an internal-combustion engine, in addition to the two-chamber resonance system formed by the resonance receptacles and the connecting pipe, suction pipe extensions are arranged which, in sections, extend in the resonance receptacles, are assigned to the suction pipes and are connected to a common receptacle provided with a fresh-air inlet, this single-chamber ram pipe system formed by the receptacle and the suction pipe extensions acting as ram pipes, supplements the resonance system such that the volumetric efficiency will rise. This means that a larger amount of fresh air is fed to each cylinder, thereby increasing the mean pressure.

In certain embodiments of the invention, the connecting pipe also has a fresh-air inlet whereby the mean pressure is further increased.

The two fresh-air inlets are advantageously combined in a common inlet opening of the receptacle, in certain embodiments of the invention. This inlet opening may be arranged on the end of the receptacle which extends in the longitudinal direction of the cylinder banks approximately in the center between the resonance receptacles. In this case, the connecting pipe is constructed to be divided, the sections of the resonance receptacles extending to the center receptacle. By means of the center inflow and the direction connection of the connecting pipe and of the suction pipe extension to the receptacle distributing the fresh air, this arrangement permits a low-loss uniform flow.

In certain embodiments of the invention, at least one suction pipe extension of each cylinder bank has a throttle valve acting as a shut-off element. In this case, the air intake system acts as a pure resonance system, these suction pipes extensions acting as switchable additional resonance pipes.

Certain embodiments of the invention further increase the mean pressure and optimize the flow conditions and vibration conditions by mutual alignment of the cylindrically constructed sections of the suction pipe extension which are situated in resonance receptacles. In this case, these have a specified distance from the admission funnels of the suction pipes.

Another optimization is achieved in certain embodiments an arrangement of sliding sleeves on the cylindrical sections, in which case the distance from the admission funnels can optionally be bridged. As a result, the charge effect of this air intake system is improved in a wide rotational speed range because of the fact that, in a low to medium rotational speed range, the sliding sleeves close off the annular gap defined by the distance and uncouple the two-chamber resonance system. As a result, only the single-chamber system is connected, in which case the suction pipe length is increased by the amount of the suction pipe extension and the overall volume of the system is reduced. By the opening of the annular gap at higher rotational speeds, the resonance system is connected, and the suction pipe length is shortened and the overall volume is reduced.

For a further improvement of the resonance characteristics, in parallel to the connecting pipe, certain embodiments of the invention provide a second connecting pipe arranged between the resonance receptacles. For the rotational-speed-optimal connection of the connecting pipes, these embodiments are provided with shut-off elements which are to be actuated as a function of the rotational speed.

Other objects, advantages and novel features of the present invention will become apparent from the following detailed description of the invention when considered in conjunction with the accompanying drawings.

BRIEF DESCRIPTION OF THE DRAWINGS

FIG. 3 is a partially sectional lateral view of a second embodiment of the invention with a modification in the left half.

DETAILED DESCRIPTION OF THE DRAWINGS

Figure 1:
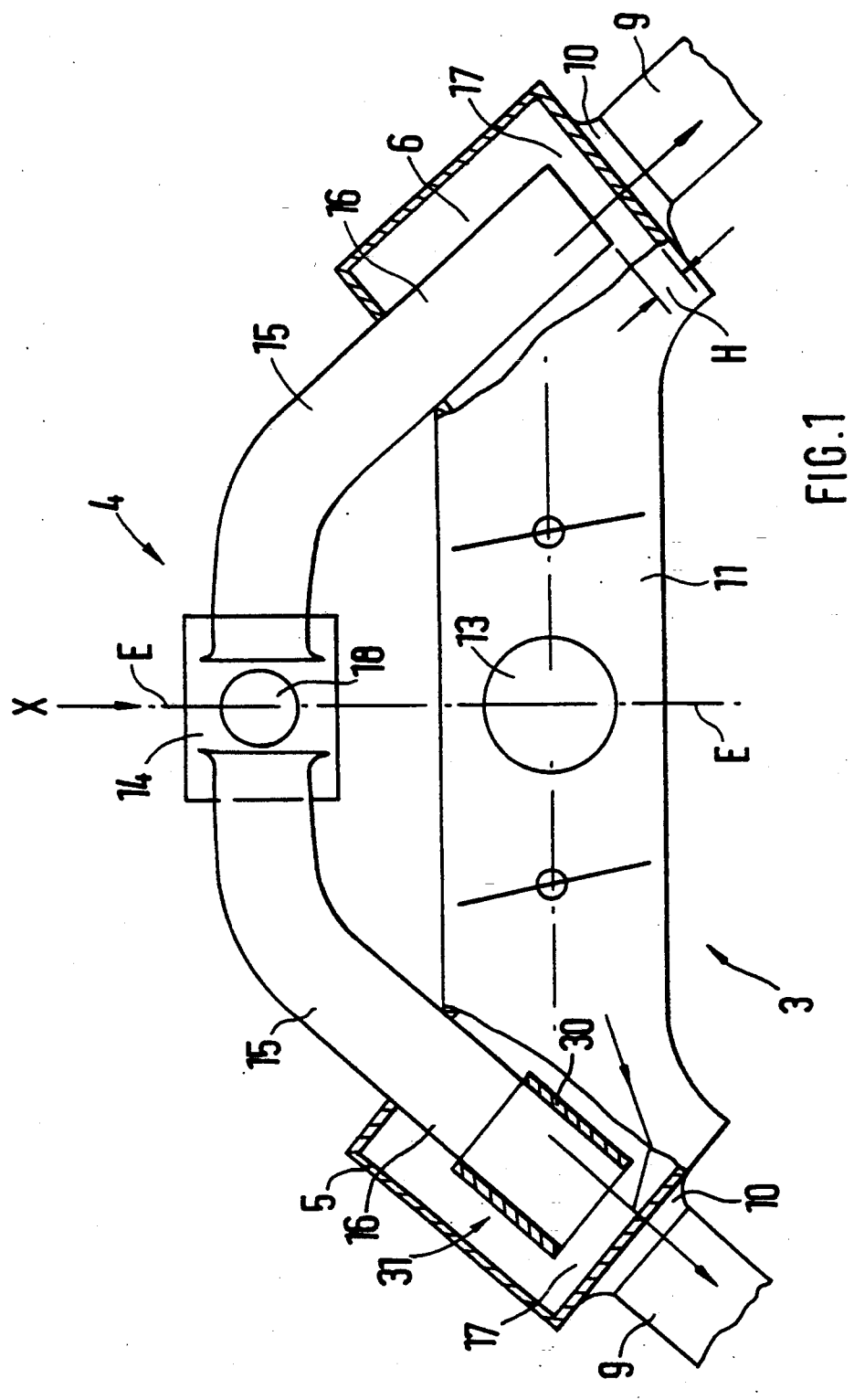
FIG. 1 is a partially sectional lateral view of a first embodiment of the invention with a modification in the left half of the figure.

An internal-combustion engine with two cylinder banks 1, 2 comprises an air intake system comprising of a two-chamber resonance system 3 and a single-chamber ram-pipe system 4.

The resonance system 3 has resonance receptacles 5, 6 which are assigned to the cylinder banks 1, 2 and to which individual suction pipes 9, which lead to the cylinders 7, 8 of the internal-combustion engine, are connected by admission funnels 10.

In addition, the reasonance system 3 has two connecting pipes 11, 12 which are connected to the resonance receptacles 5, 6, with air being supplied to a connecting pipe 11 via a fresh-air inlet 13.

A receptacle 14 is arranged approximately in the center between the resonance receptacles 5, 6 in a plane of symmetry E—E. This receptacle 14 extends in its largest dimension along a longitudinal direction R of the cylinder banks 1, 2. Suction pipe extensions 15 are connected on both sides to this receptacle 14, these suction pipe extensions 15 being provided with cylindrical sections 16 which extend inside the resonance receptacles 5, 6. Together with the receptacle 14, the suction pipe extensions 15 form the single-chamber ram-pipe system 4. The sections 16 are arranged at a distance from and coaxially aligned with the admission funnels 10. The resulting separation space H defines an annular gap 17.

FIG. 1, of which only the part situated on the right of plane E—E is relevant at this point, shows a first embodiment. The receptacle 14 has a fresh-air inlet 18. Taken-in air flows into the system through this fresh-air inlet 18 and through the additional fresh-air inlet 13. Via the annular gap 17, air reaches the cylinders 7, 8 through the connecting pipes 11, 12, which act as resonance pipes, as well as via the suction pipe extensions 15 which act as swing pipes.

Figure 2:
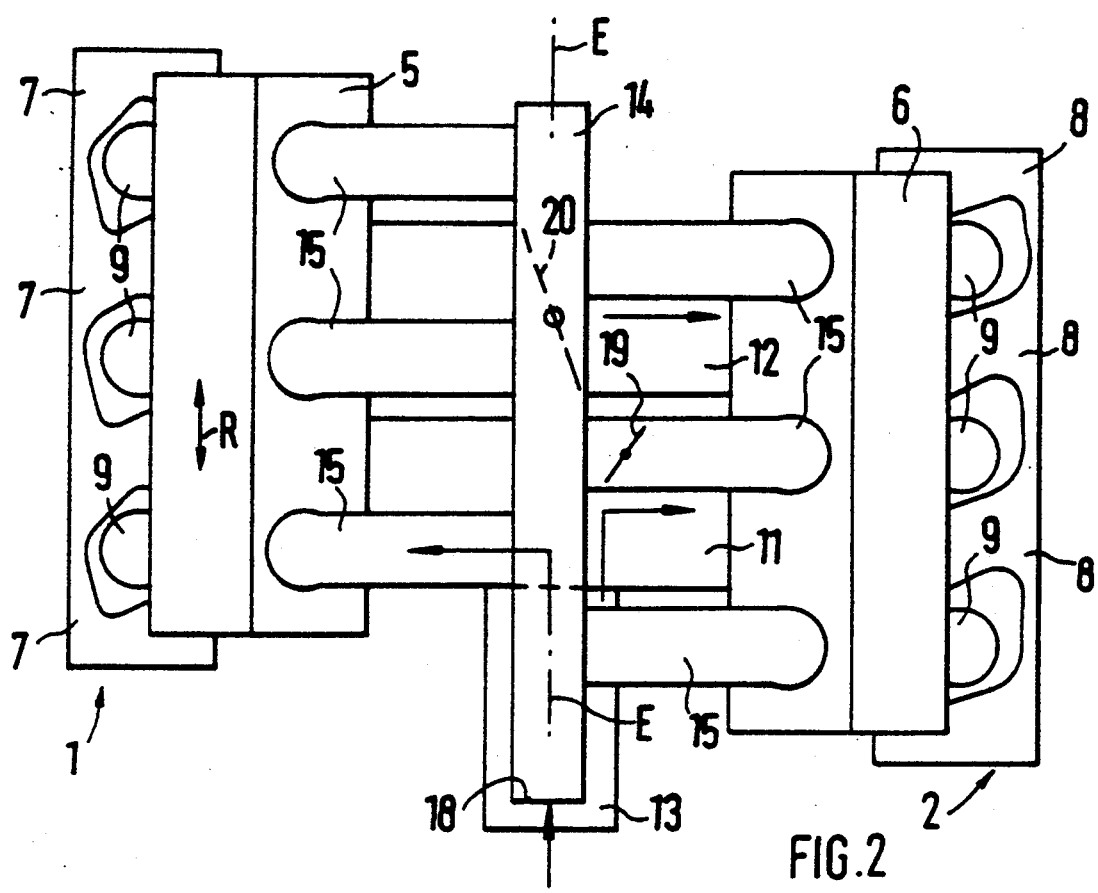
FIG. 2 is a top view in the direction of the arrow X according to FIG. 1.
Figure 4:
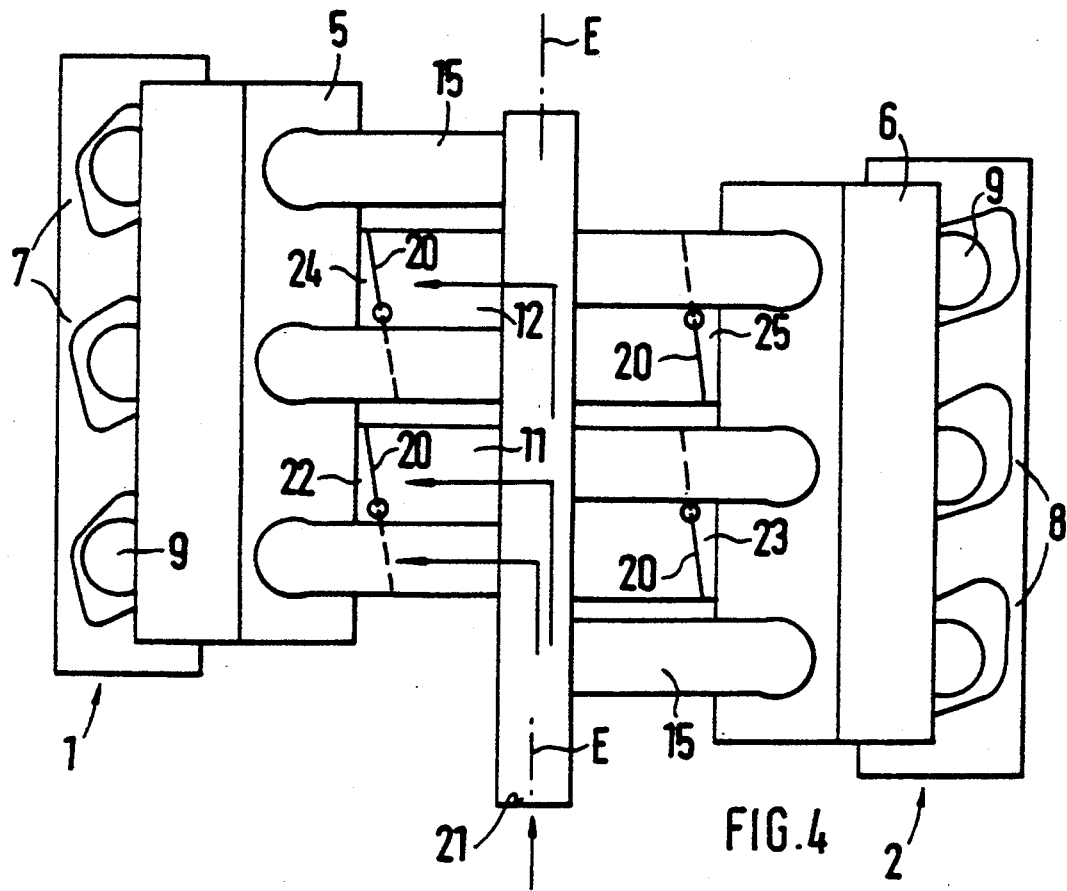
FIG. 4 is a top view in the direction of the arrow Y according to FIG. 3.

The middle one of the suction pipe extensions 15 has a controllable throttle valve 19 (FIG. 2). This suction pipe extension 15 acts as an additional resonance pipe in the case of certain rotational speeds and therefore contributes to the increase of the torque.

For the additional targeted connecting of the second connecting pipe 12, this connecting pipe 12 has a controllable throttle valve 20.

In a second embodiment of the invention according to FIG. 3, the first and the additional fresh-air inlet 13 and 18 are jointly arranged in an inlet opening 21 of the receptacle 14 which extends in the plane E—E in a disk-shaped manner. The connecting pipes 11, 12 have a divided construction, each partial pipe section 22, 23, 24, 25 extending between a resonance receptacle 5, 6 and the receptacle 14 and each having a controllable throttle valve 20.

In the representation according to FIGS. 1 and 3 which is in each case situated to the left of the plane of symmetry, a modification of the respective variant is illustrated which has a sliding sleeve 30 disposed in a slidably displaceable manner on section 16. An adjusting mechanism is shown only in FIG. 3.

The sliding sleeves 30 arranged in a resonance receptacle 5, 6 are each combined to a constructional unit 31 which, in a manner which is known per se and is therefore not described, can be displaced by a control element constructed as a pneumatic pressure cell 32 and a linkage 33 while bridging the annular gap 17.

In the case of relatively low rotational speeds, a high torque is achieved by means of long suction pipes and a relatively small overall volume of the air intake system. For this purpose, the pressure cell 32 adjusts in this operating range of the internal-combustion engine the constructional unit 31 into the position indicated by an interrupted line in FIG. 3 which closes the annular gap 17. When the resonance receptacles 5, 6 are uncoupled, the taken-in fresh air will now arrive in the suction pipes 9 only via the fresh air inlet 18 and the connected suction pipe extensions 15.

When a medium rotational speed range is reached, the pressure cell 32 adjusts the constructional unit 31 into the position of the sliding sleeves 30 illustrated in FIGS. 1 and 3 by drawn-out lines. With the interposition of the resonance receptacles 5, 6 taken-in fresh air in this case arrives in the annular gap 17 via the connecting pipes 11, 12 which can be connected step-by-step as well as via the sections 16.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air intake system of a multi-cylinder two-bank internal-combustion engine, the cylinder of one bank each being connected by suction pipes to a resonance receptacle assigned to said bank, comprising
   at least one connecting pipe between the resonance receptacles; and
   suction pipe extensions which are respectively assigned to the suction pipes, and have sections that extend inside the resonance receptacles and are connected to a common receptacle that has a fresh-air inlet.

2. A system according to claim 1, wherein the connecting pipe has an additional fresh-air inlet.

3. A system according to claim 2, wherein the fresh-air inlet and the additional fresh-air inlet are jointly arranged in an inlet opening of the common receptacle.

4. A system according to claim 3, wherein at least one suction pipe extension of each cylinder bank has a shut-off element.

5. A system according to claim 3, wherein the sections of the suction pipe extension that extend inside the resonance receptacles are cylindrical, aligned with admission funnels of the suction pipes, and are separated from the admission funnels by a space.

6. A system according to claim 5, further comprising sliding sleeves on the sections of the and suction pipe extensions which are displaceable to selectively bridge the space.

7. A system according to claim 3, wherein the common receptacle, extending in the longitudinal direction of the cylinder banks is arranged approximately in the center between the resonance receptacles, and the connecting pipe is connected to the resonance receptacle which has an inlet opening on its end side.

8. A system according to claim 7, further comprising another connecting pipe extending in parallel to said one connecting pipe and arranged between the resonance receptacles, at least one of these pipes having at least one shut-off element.

9. A system according to claim 6, wherein the sliding sleeves of each resonance receptacle are coupled to form a constructional unit which is displaced by a control element arranged on the resonance receptacle.

10. A system according to claim 2, wherein at least one suction pipe extension of each cylinder bank has a shut-off element.

11. A system according to claim 2, wherein the sections 16 of the suction pipe extension that extend inside the resonance receptacles are cylindrical, aligned with admission funnels of the suction pipes, and are separated from the admission funnels by a space.

12. A system according to claim 10, further comprising sliding sleeves on the sections of the suction pipe extensions which are displaceable to selectively bridge the space.

13. A system according to claim 12, wherein the sliding sleeves of each resonance receptacle are coupled to form a constructional unit which is displaced by a control element arranged on the resonance receptacle.

* * * * *